United States Patent
Wu

(10) Patent No.: US 6,529,202 B2
(45) Date of Patent: *Mar. 4, 2003

(54) COLOR ADVISER

(75) Inventor: Jing Wu, Carlton (AU)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/165,734

(22) Filed: Oct. 5, 1998

(65) Prior Publication Data

US 2002/0027561 A1 Mar. 7, 2002

(30) Foreign Application Priority Data

Oct. 3, 1997 (AU) ............................................. PO9602

(51) Int. Cl.[7] ................................................ G06K 9/00
(52) U.S. Cl. ........................... 345/593; 345/22; 345/83; 345/88; 345/426; 345/589; 345/591; 345/600; 345/604; 382/162; 382/164; 382/197; 382/173
(58) Field of Search .............................. 345/22, 83, 88, 345/426, 589, 591, 593, 600, 604; 382/162, 167, 164, 173

(56) References Cited

U.S. PATENT DOCUMENTS 4,718,090 A  *  1/1988  Cooper, Jr. ................. 382/204
5,254,978 A      10/1993  Beretta ........................ 345/150
5,434,957 A  *  7/1995  Moller ........................ 395/131
5,557,688 A  *  9/1996  Nakamura ................... 382/164
5,757,516 A  *  5/1998  Naylor, Jr. ................... 358/463
5,825,917 A  *  10/1998  Suzuki ........................ 382/164
5,970,164 A  *  10/1999  Bamberger et al. ......... 382/128
5,987,219 A  *  11/1999  Naylor, Jr. et al. ......... 395/109
6,008,815 A  *  12/1999  Levison ....................... 345/428

FOREIGN PATENT DOCUMENTS

AU    31710/95    3/1996    ........... G06F/17/00
FR    2760873     3/1997    ........... G06T/11/40

* cited by examiner

Primary Examiner—Bipin Shalwala
Assistant Examiner—Vincent E. Kovalick
(74) Attorney, Agent, or Firm—Fitzpatrick, Cella, Harper & Scinto

(57) ABSTRACT

A method of determining image representative colors for an image comprising a plurality of image elements having color information associated therewith. Initially, the image elements are grouped into a plurality of image element groups on the basis of their colors. An initial representative color is then generated for each of the image element groups, the initial representative colors subsequently being clustered together into color clusters in a color space. Finally, an image representative color is determined based on each respective color cluster. Also shown is a method of using one or more of the image representative colors as a basis for providing one or more aesthetic color suggestions for a given image. A set of color selection rules is provided, and an aesthetic color suggested on the basis thereof.

22 Claims, 8 Drawing Sheets

Color Wheel

COLOR ADVISER

FIELD OF THE INVENTION

The present invention relates to image processing and in particular to a method of automatically selecting colours and providing automated colour advice for graphics design applications.

BACKGROUND

Good colour combination is a desirable feature of graphics design. Positioning text or clip art within an image or printing an image on a coloured background are examples where an artist may be employed to select aesthetically pleasing colour combinations. However, the selection of aesthetically pleasing colour combinations is performed manually, and is often a relatively subjective process.

In content-based image retrieval systems, a popular method of extracting image colour content is to use histograms. To reduce storage required and increase speed, the dimensions of colour histograms are reduced by using some quantisation technique which operates in a perceptually uniform colour space. After histogram dimension reduction, a fixed number of colour bins are used for storing colours. The greater the number of colour bins used, the better quality the reconstructed image has and the greater the storage required.

Unfortunately, using fixed colour bins, the colours of any image can only be represented by fixed colour regions, because known colour extraction systems do not adapt to individual images or the amount of storage available on a system.

Recently, with a growing number of images and video clips available, both on the internet and for personal computers, there is perceived to be a need for an automated colour adviser for use by amateur and professional manipulators of graphic images.

SUMMARY

In accordance with a first aspect of the present invention, there is provided a method of determining image representative colours for an image comprising a plurality of image elements having colour information associated therewith, the method including the steps of:
  grouping the image elements into a plurality of image element groups on the basis of colours of the image elements;
  generating an initial representative colour for each of the image element groups;
  clustering the initial representative colours together into colour clusters in a colour space; and
  determining an image representative colour based on each respective colour cluster.

In accordance with a second aspect, there is provided a method of providing one or more aesthetic colour suggestions for a given image comprising a plurality of image elements having colours associated therewith, the method including the steps of:
  extracting image representative colour information from the image based on the colours of the image elements;
  providing a set of colour selection rules.

BRIEF DESCRIPTION OF DRAWINGS

Notwithstanding any other forms which may fall within the scope of the present invention, preferred forms of the invention will now be described, by way of example only, with reference to the accompanying drawings, in which.

DETAILED DESCRIPTION

Figure 1:
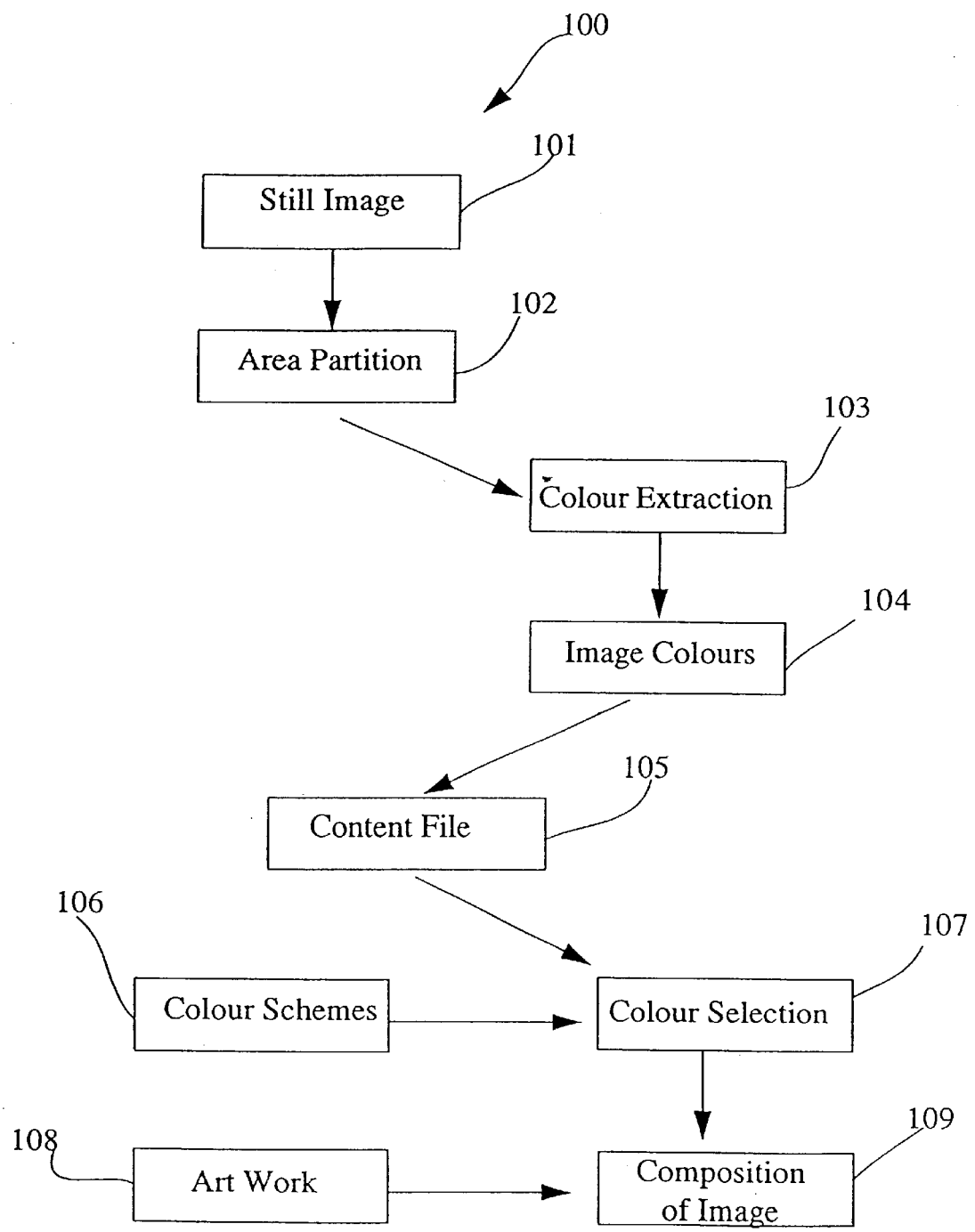
FIG. 1 is a block diagram of process steps in accordance with the present invention.

Referring to the drawings, FIG. 1 shows a block diagram of process steps of a preferred embodiment of the present invention. The steps include inputting of an image (step 101), partitioning the image into a plurality of areas (step 102), extracting predetermined colours from at least one partition of the image (step 103), determining, for each colour extracted, a relative measure of dominance (step 104), choosing, from the extracted colours, colours relating to a predetermined area of the image (step 105), using the chosen colours and predetermined colour schemes 106 for selecting desired colours (step 107), utilising the selected colours for predetermined art work 108, and compositing the coloured art work 108 with the input image 101 (step 109).

In the preferred embodiment, the image 101 is partitioned 102 before extracting colour content information at step 103. Depending on the nature, size, etc of the art work 108, and its application to the image 101, differing areas of the image can be of interest when extracting colour information 103. For example, where the art work 108 is a line of text to be added to the bottom of the image 101, the area of most interest is the lower area of the image. However, colours from the middle and upper areas can be used as an associated colour reference. Another example is adding art work 108 in the form of a strip of clip-art vertically across the image 101. The image 101 can be partitioned vertically into sub-images, colour information then being extracted from each sub-image.

More complex partitioning (e.g. horizontal and vertical partitioning) is used to partition the image 101 into sub-images comprising areas of most interest. Colours extracted from the sub-images can be combined to produce more complex effects when compositing art work with the image 101.

Turning to step 103, in the preferred embodiment, colour content extraction is implemented using an adaptive colour bin technique. A colour bin is a storage position representing substantially one colour. For example a colour bin designated as a "blue bin" is used as a representation of each extracted colour which is substantially near blue in a predetermined colour space. Each colour extracted from the image 101 in step 103 is placed in a predetermined corresponding colour bin. Thus a plurality of predetermined colours extracted from an image requires a corresponding number of colour bins. In the adaptive colour bin technique, the number of colour bins is adapted to suite each particular image. That is, for a given number of colours extracted from an image, a substantially equal number of colour bins are made available. A process for reducing the number of colour bins, in accordance with the preferred embodiment, will be described hereinafter.

The representation of the colour bins in colour space is also adaptive and can change from image to image. An advantage of an adaptive colour bin technique is reduced memory requirements and potentially more accurate colour representation for a given image. In view of the preferred implementation, the colour content extraction step 103 is optionally referred to herein as the adaptive colour content extraction 103.

For each extracted colour a relative dominance measure 104 of the colour is determined. This relative dominance measure is preferably a pixel population count as a percentage of the total number of pixels in a predetermined area of the image. The predetermined area will usually be that defined by a partition of interest, but can also be some other selected portion of the image, including the whole of the image itself. Alternatively, an absolute pixel count, either within a given partition or over the whole image, can suffice. It will be appreciated that other techniques can be used to determine the relative dominance measure of respective colours without departing from the scope and spirit of the present invention. For example, an area occupied by a colour as a percentage of a total area of interest can be a measure of the amount of that colour in the total area of interest.

The extracted colours are stored in a colour content file together with their corresponding relative dominance measure. Colour content information, that is, extracted colours and their respective relative dominance measures, is preferably generated off-line. The colour selection step 107 uses the colour content information together with predetermined colour schemes 106 to select colours, or optionally provide colour suggestions, for art work 108 to be composited 109 (or overlaid) with the image 101.

Figure 2:
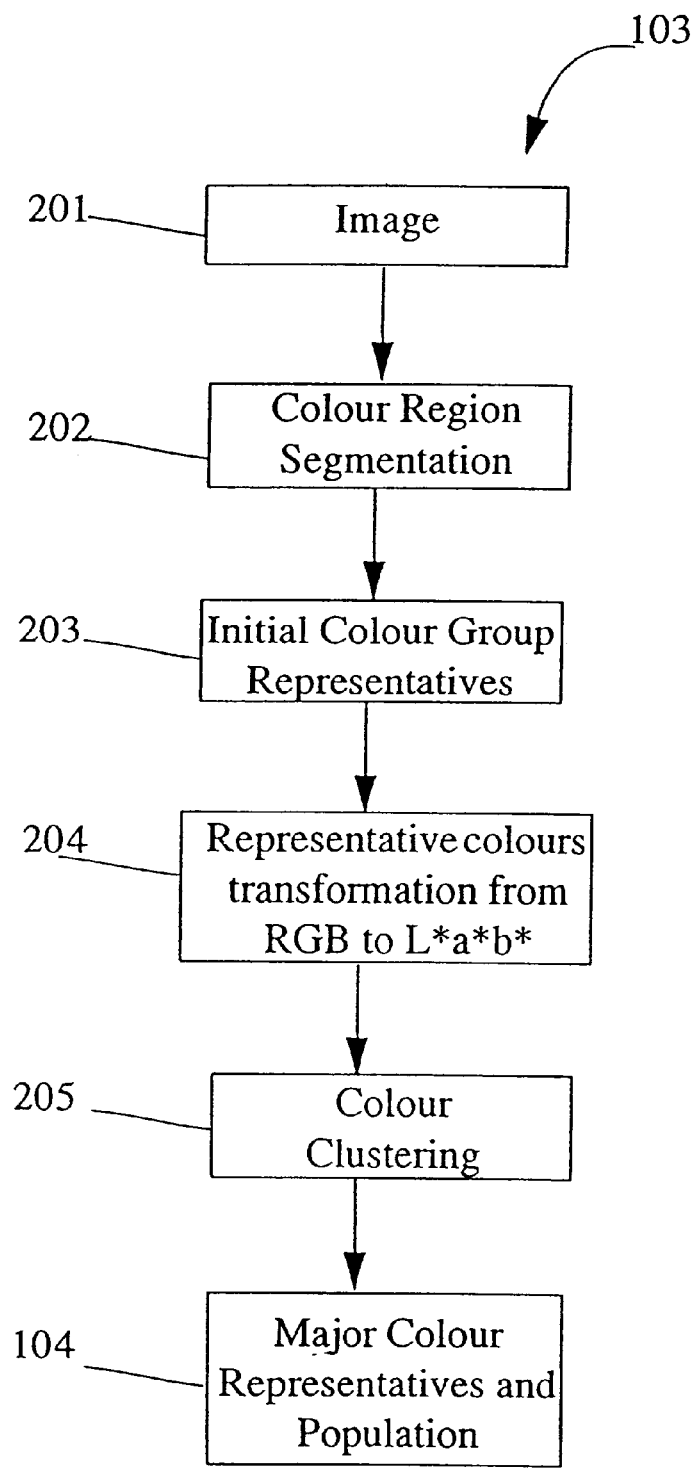
FIG. 2 is a block diagram of process steps for colour content extraction in accordance with the present invention.

Referring now to FIG. 2 there is shown the adaptive colour content extraction step 103 of FIG. 1 in more detail. Initially, an image 201 is received by the adaptive colour content extraction step 103 and an initial spatial grouping (or segmentation) of pixels is performed (step 202). A representative colour is chosen in step 203 for each initial spatial grouping generated by step 202. The representative colour for each initial spatial grouping 202 is transformed to a uniform colour space (e.g. CMYK, RGB or L*a*b colour space). In step 205, colour clustering takes place, in which colours that are within a predetermined distance of each other in colour space are grouped together into a colour cluster.

A representative colour for each colour cluster is determined along with a relative dominance measure 206 (e.g. relative pixel population). The initial spatial colour grouping 202 can use any known region-based colour image segmentation technique. In this step 202, an image is partitioned into colour regions by seeking connected groups of pixels which have substantially similar colours over a predetermined local region. Preferably, very small isolated initial spatial groupings 202 are ignored in order to find major colour regions and reduce noise effects.

In the preferred embodiment, the initial spatial grouping, or image colour region segmentation, uses a region growing technique. A colour region of the image 201 starts from an arbitrarily chosen pixel therein. The pixel is compared with its neighbouring pixels, the region size being increased by adding neighbouring pixels (i.e. pixels nearest to the colour region) which are substantially similar in colour.

In the region growing technique, a colour similarity threshold T is used to determine whether or not the colours of two neighbouring pixels are substantially similar. A colour region neighbouring pixel is added to the region if $|Rp-Rm|<T$ and $|Gp-Gm|<T$ and $|Bp-Bm|<T$, where Rp, Gp and Bp are red, green and blue values of the neighbouring pixel, and Rm, Gm and Bm represent an average red, green and blue value of the colour region respectively. When a region has no more neighbouring pixels of substantially similar colour, no more pixels are added to the colour region, which then represents one of the initial spatial groupings.

If the number of pixels in a colour region is below a predetermined threshold value, the colour region is ignored and therefore does not form part of the initial spatial colour grouping generated in step 202. A colour region having a number of pixels meeting or exceeding the predetermined threshold value is accepted as an initial spatial grouping and is represented by an average colour of the colour region.

Pixels of the image not yet processed by the region growing technique are arbitrarily chosen, and a colour region grown therearound using the region growing technique, until each pixel of the image 201 either belongs to an initial spatial grouping or has been rejected for being part of a relatively small region as defined by the predetermined threshold value. A result of the region growing technique is usually a plurality of initial spatial group with each group being represented by an average colour of its pixels. The average colour of each initial spatial grouping is referred to as an initial representative colour, or initial colour group representative.

The initial colour group representative is expressed in Red, Green, Blue (RGB) colour space, but an alternate colour space can be used without departing from the scope and spirit of the invention.

The next step 204 is a transformation of each initial colour group representative from RGB colour space to CIE L*a*b* uniform colour space. Next, colour clustering (step 205) is performed whereby initial colour group representatives within a predetermined threshold distance Dt of each other in uniform colour space are grouped into a colour cluster. The threshold distance Dt provides a measure of difference (or similarity) between two colours and is therefore also referred to as the colour difference threshold. A colour difference between two initial colour group representatives is defined as:

$$Dt > D = [(L_1^* - L_2^*)^2 + (a_1^* - a_2^*)^2 + (b_1^* - b_2^*)^2]^{\frac{1}{2}}$$

If two initial colour group representatives are close to each other in colour space (that is, the difference of two initial colour group representatives is less than Dt), they are merged to form one colour cluster. A representative colour is then determined for the colour cluster. This colour clustering is iteratively applied to respective pairs of initial colour group representatives and to respective pairs of representative colours of colour clusters until substantially all initial colour group representatives form part of a colour cluster and the number of colour clusters remains unchanged for successive iterations.

As previously described, the initial spatial groupings provide a colour region segmentation of the image 201 and therefore a colour cluster represents a grouping of one or more colour region segmentations of the image 201 (i.e. spatial regions). Therefore colour clusters are also associated with one or more spatial regions of the image 201. Preferably each iteration compares a representative colour of a largest spatial region to a smallest spatial region, the spatial regions' sizes preferably being measured in pixels. Colours representing small spatial regions are grouped into a representative colour of a cluster associated with a larger spatial region if the colours of those small regions are close to, in colour space, the representative colour of the larger region.

Finally, representative colours for resulting colour clusters are recalculated by considering the number pixels of each initial colour grouping. The recalculated representative colours for the resulting colour clusters substantially represent major (or dominant) colours of the image 201.

The next step in FIG. 2 is to determine for each colour extracted (i.e. representative colours of clusters of major colours of the image) a relative measure of dominance, as described with reference to FIG. 1.

Figure 3:
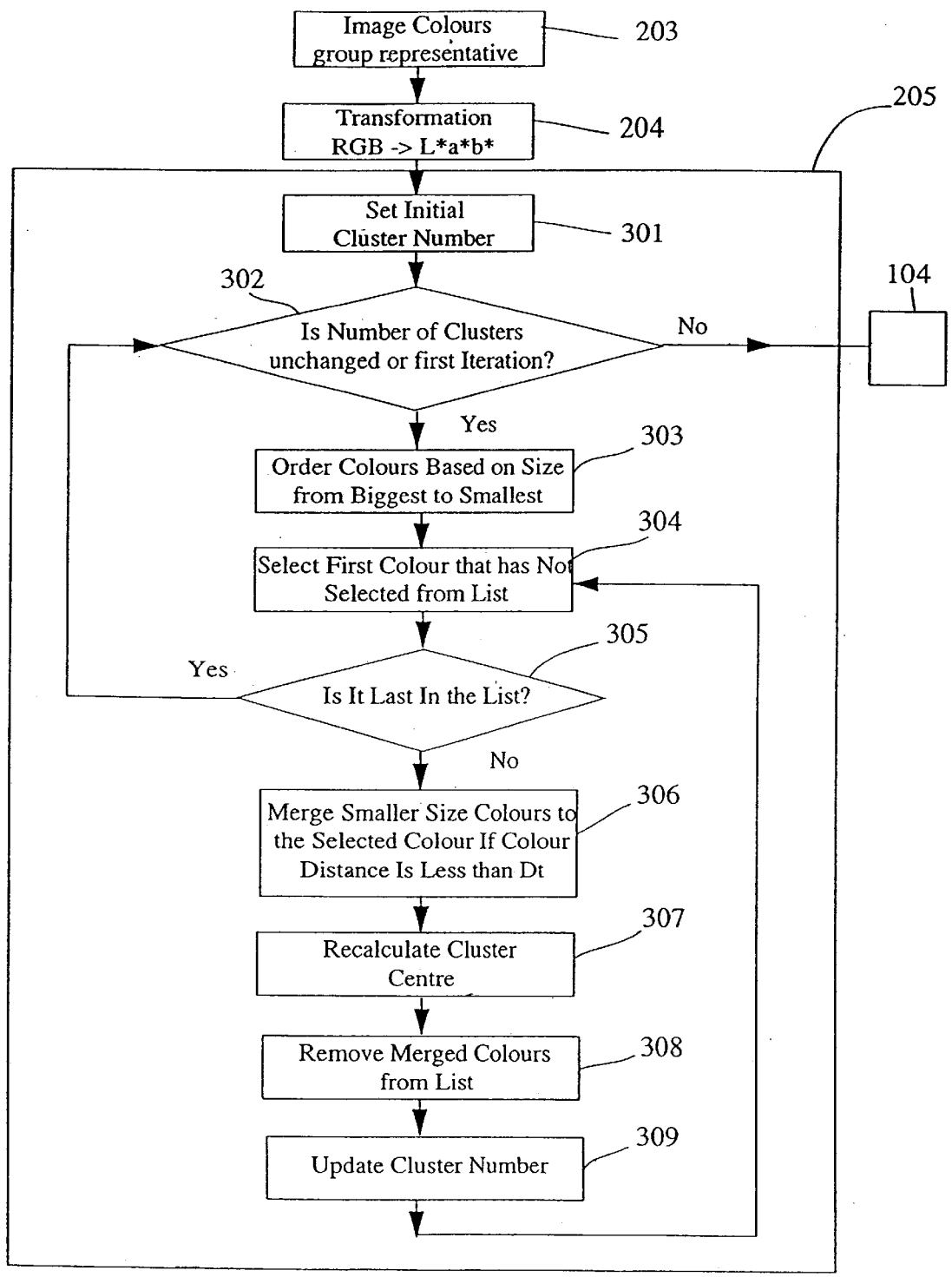
FIG. 3 is a flow chart of a process of colour clustering in accordance with the present invention.

Referring to FIG. 3 there is shown in more detail the colour clustering step 205 of FIG. 2. The colour averaging step 203 and the colour transform from non-uniform colour space step 204, have been described previously with reference to FIG. 2. After the colour transform step 204 an initial set of colour clusters is determined 301. Preferably the number of clusters in the initial set of colour clusters corresponds to the number of initial colour groupings.

A next step, following the determination of the initial set of colour clusters, is a decision step 302 which checks, firstly, whether the current iteration is a first iteration and, secondly, whether the number of colour clusters resulting from the current iteration is equal to the number of colour clusters of the previous iteration.

If the first of these conditions is true, that is, if the current iteration is the first iteration, then the second condition need not be assessed, since whatever the result of the second condition the overall result of the decision step 302 is "true" and a flow control goes to a next step 303, in which representative colours of a current set of colour clusters are sorted in descending order according to a size of a spatial region associated with each colour cluster. Otherwise where the first condition, in decision step 302, returns a "false", that is, the current iteration is not the first iteration, then the second condition is relied upon for an overall result of the decision step 302.

When the first condition returns a "false" and the second condition returns a "true", that is, the number of clusters are unchanged over a successive pair of iterations, the overall result of the decision step 302 is "false", the cluster grouping step is concluded and a resulting current set of colour clusters is passed to the step 104 of determining a relative dominance measure. However, if the second condition returns "false", the overall result of decision step 302 is "true" and control is passed to the ordering step 303 which provides an ordered list of representative colours in descending order of associated spatial region size.

A next step 304 selects, in descending order, a representative colour which has not previously been selected, from the ordered list. Following selection of the representative colour, step 305 checks whether or not to the selected representative colour is the last colour of the ordered list. If it is the last colour, the decision step 305 returns a "true" which results in a loop back to decision step 302, which is turn proceeds as hereinbefore described. However, at decision step 305, if the selected representative colour is not the last colour on the order list below the colour cluster represented by the selected representative colour based on the inequality EQ1 (that is, if the selected representative colour is within a predetermined threshold distance Dt, in uniform colour space, below the selected presentative colour), then the cluster represented by the other representative colour is merged with the cluster represented by the selected representative colour.

Control is then passed to a next step 307 which re-calculates a representative colour for the colour cluster resulting from a merger of two colour clusters. A next step 308 of the process is to remove, from the ordered list of representative colours, each of the representative colours which were merged at step 306.

A next step 309 is to update a colour cluster count to reflect mergers and removal of representative colours from the ordered list.

Following the update cluster count step 309 the process flow loops back to step 304 to select another representative colour for which steps 305 to 309 are repeated until decision step 305 loops back to decision step 302, decision step 302 returns an overall result of "false" and a resulting current set of colour clusters is passed to step 104 as previously described.

Figure 4:
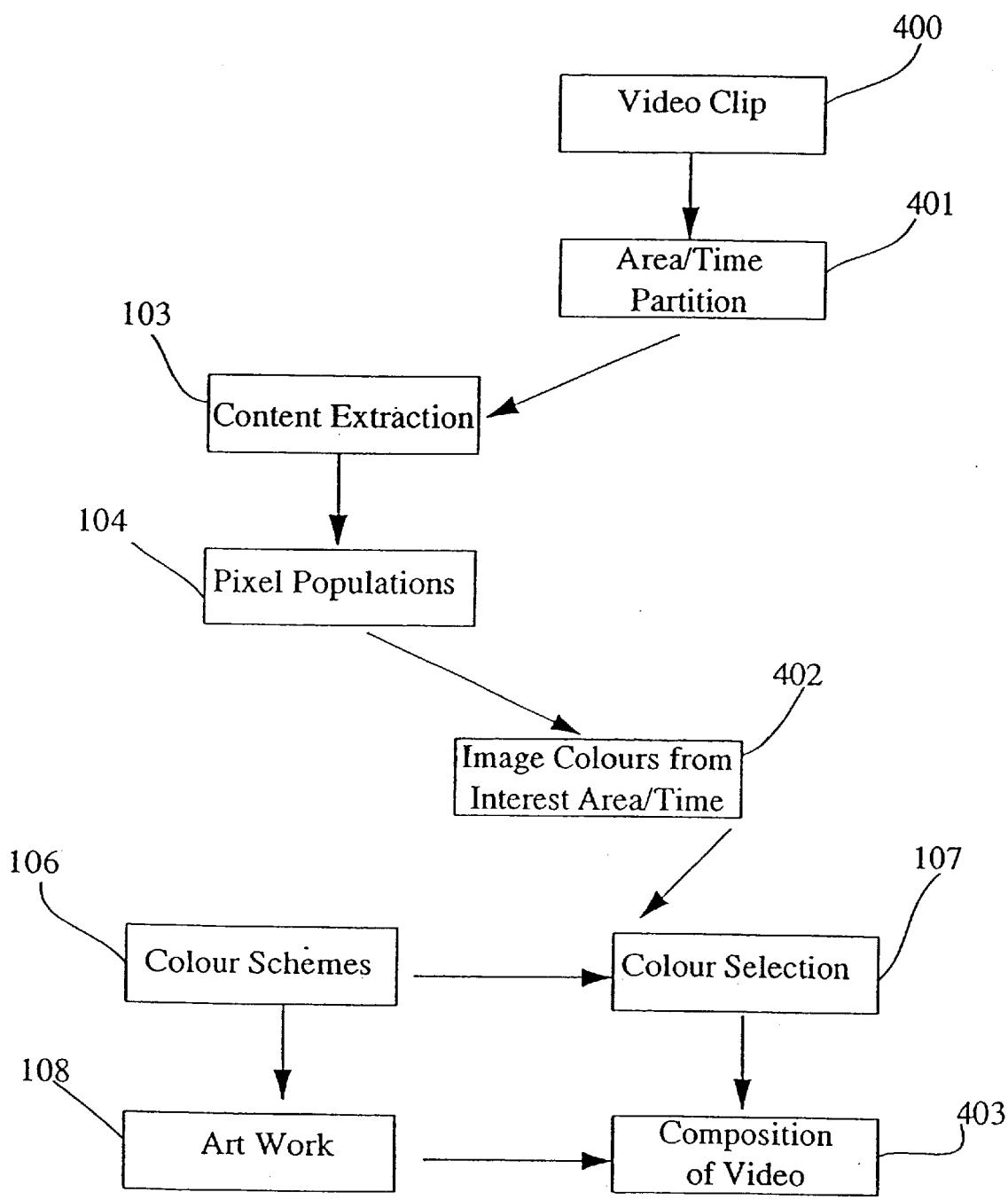
FIG. 4 is a block diagram of process steps in accordance with the present invention.

An alternative embodiment, illustrated in FIG. 4, accords substantially with the preferred embodiment as previously described, except that the input image is a video clip 400 comprising a plurality of images. Partitioning 401 the video clip 400 involves partitioning predetermined areas of sequential video frames, preferably analysed over a predetermined time interval. Colour content information is extracted by analysing the predetermined area of the sequential video frames over a predetermined time interval. Desirably, the predetermined time interval corresponds at least generally with a time interval over which it is intended to display artwork with the video clip 400. The temporal extent of the sequence of video frames is referred to herein as a video shot time duration.

A colour content file for the video clip 400 comprises extracted colour and a relative dominance measure, which is now a function of time. For example a pixel population count for a representative colour of a colour cluster includes a count of pixels of that colour over the predetermined time interval. Naturally, during image compositing step 403, video compositing operators and rules are applied (step 403). Other aspects of the embodiment shown in FIG. 4 correspond with similarly numbered steps in the FIG. 1 embodiment.

Figure 5:
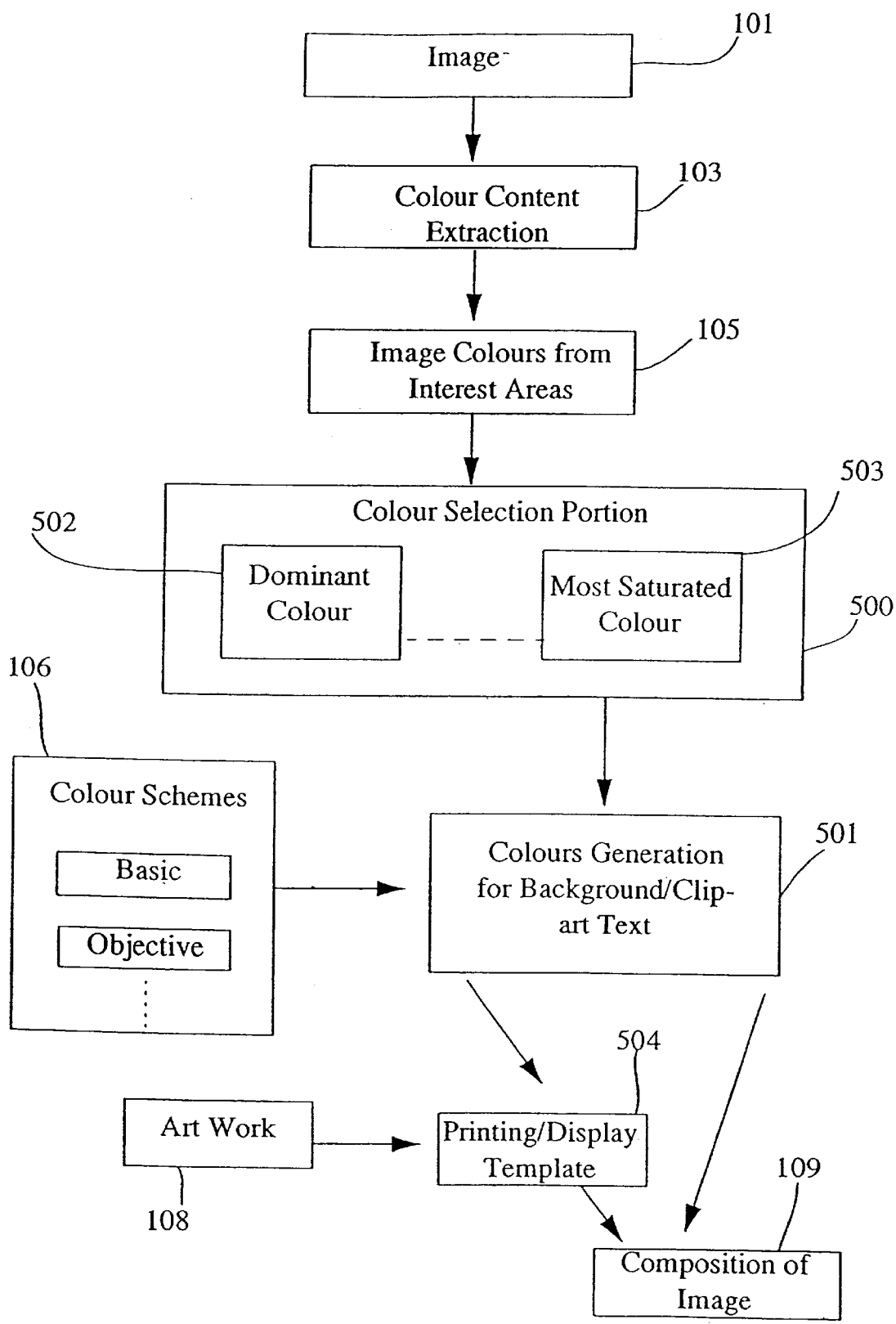
FIG. 5 is a block diagram of process steps for colour selection in accordance with the present invention.

Referring to FIG. 5, there is shown in more detail the colour selection step 107 of FIG. 1. Steps 101 to 103 of FIG. 5 correspond with similarly numbered steps in FIG. 1. The colour selection step 107 of FIG. 1 comprises a colour selection portion step 500 and a colour generation step 501. A colour content file 502 comprises dominant colours content information extracted from the image 101 and the colour selection portion step comprises selecting a predetermined number of dominant colours 502. Preferably, the predetermined number of dominant colours is selected so that spatial regions represented by the dominant colours cover a substantial portion of an area of interest of the image 101. However, the colour selection portion step 500 can, depending on a particular colour scheme used and/or the specific application, select the most saturated colours 503 or another predetermined set of colours from the content file. The colour generation step 501 receives the selected colour from the colour selection portion step 500 and applies a set of rules from a predefined colour scheme 106 to generate colour for background, clip-art, text or a combination thereof for compositing 109 with the image 101.

A printed template 504, including additional artwork 108, can also be displayed or printed before compositing 109.

Figure 6:
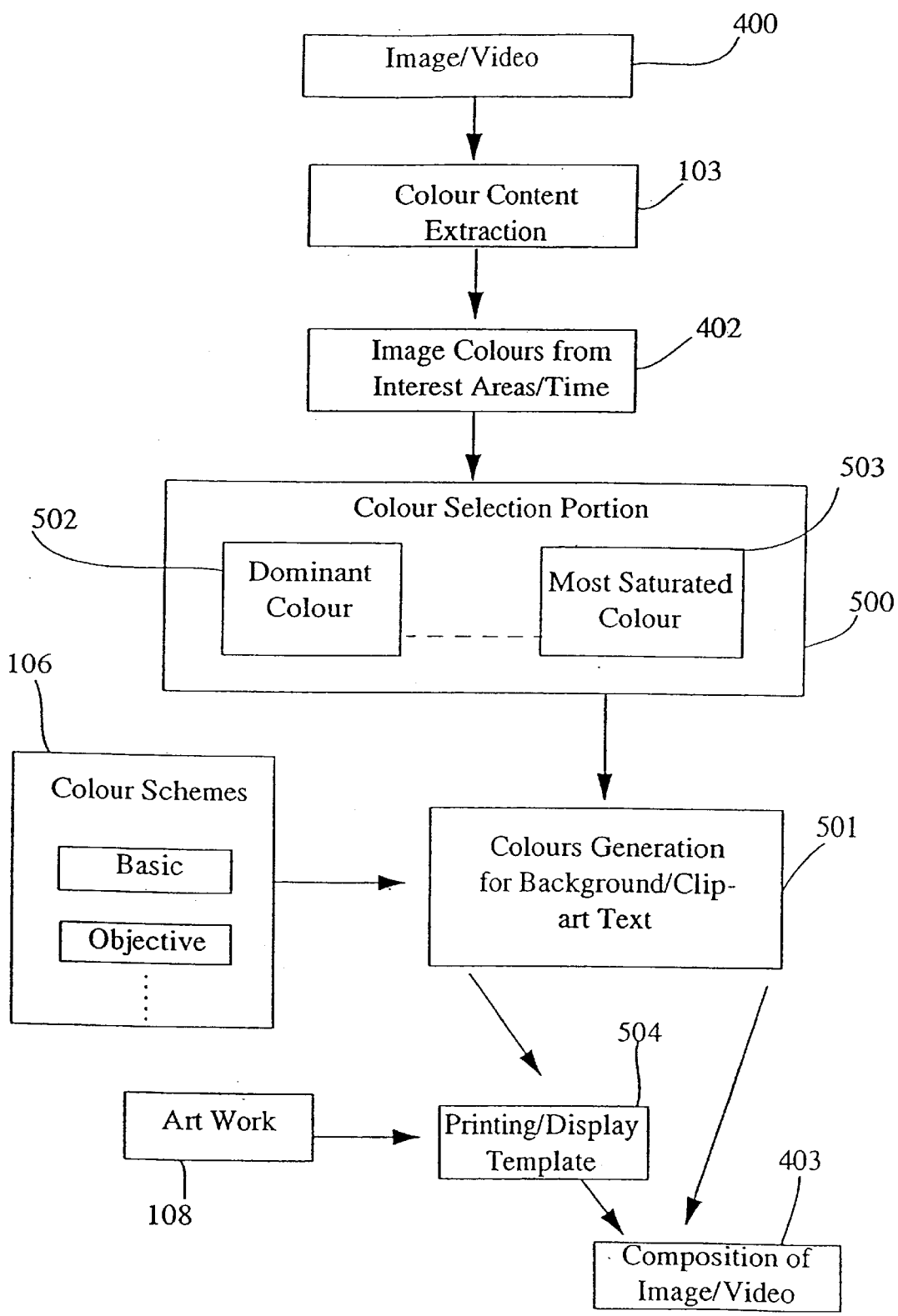
FIG. 6 is a block diagram of process steps for colour selection in accordance with an alternative embodiment of the present invention.

FIG. 6 shows a similar series of steps to those shown in FIG. 5 for an alternative embodiment in which the input image takes the form of a video clip. Accordingly, the area of interest 402 is a temporal extent within the video clip, and the image compositing is video image compositing 403.

Figure 7:
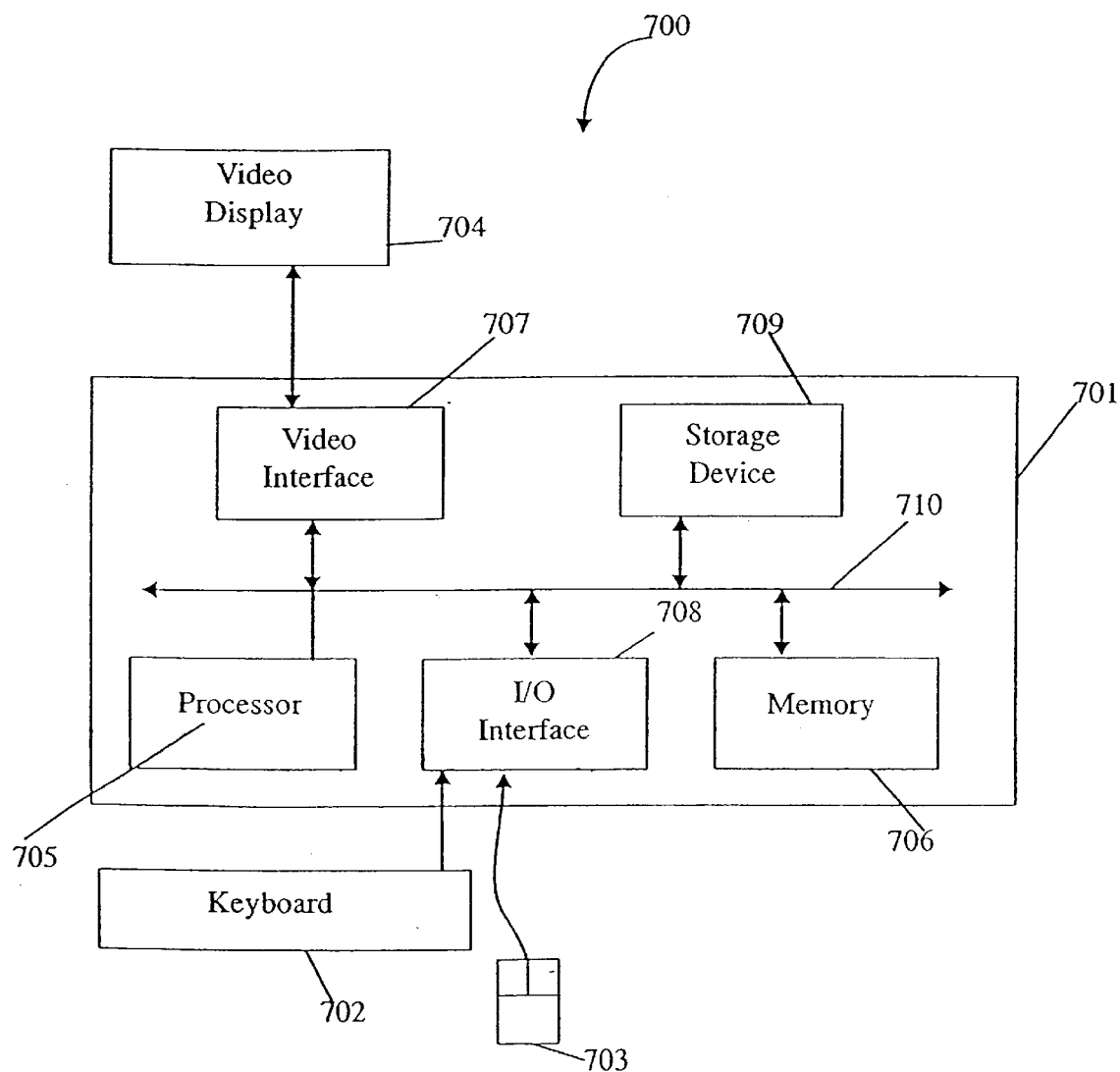
FIG. 7 is a block diagram of an apparatus for implementing the embodiments of the present invention.

The embodiments of the invention can preferably be practised using a conventional general-purpose computer, such as that shown in FIG. 7, wherein the process described with reference to FIG. 1 to FIG. 6 is implemented in software executed on the computer. The computer system 700 comprises a computer 701, input devices in the form of keyboard 702 and mouse 703, and a display device 704. The computer 701 comprises at least one processor unit 705, a memory unit 706 which typically includes random access memory (RAM) and read only memory (ROM), and input/output (I/O) interfaces including a video interface 707 and keyboard and mouse (or joystick) interface 708. The storage device 709 can include a floppy disk, a hard disk drive, a CD-ROM drive or any other suitable non-volatile storage device. The components 705 to 709 of the computer 701 communicate via an interconnecting bus in a maimer which results in a usual mode of operation of the computer system 700 known to those in the relevant art. Examples of computers on which the embodiments can be practised include IBM-PC/ATs and compatibles, Sun Sparcstations or like computer systems.

Examples of rules used by the colour generation step 501 to generate (select) a plurality of colours for background, clip-art, text and other art works are described below. An example of a colour scheme is also described. These rules and colour schemes are offered by way of example only and are not to be taken as limiting upon the embodiments of the present invention.

From the dominant colours received by the colour generation step 501, one colour is selected as a major image colour (i.e. having a large pixel population) in a predetermined area of an image, the major colour having a predetermined hue, saturation and value. A group of monochromatic and complementary colours are determined based upon the major image colour. For example, for monochromatic colours, the same hue as the major image colour is selected, but having differing saturation and value levels. The complementary colours are based on a hue opposite that of the major image colour on an HSV diagram, again with differing saturation and value levels. Saturated colours are based on a highest saturation level and on predetermined value range obtained from the dominant (extracted) colours.

Figure 8:
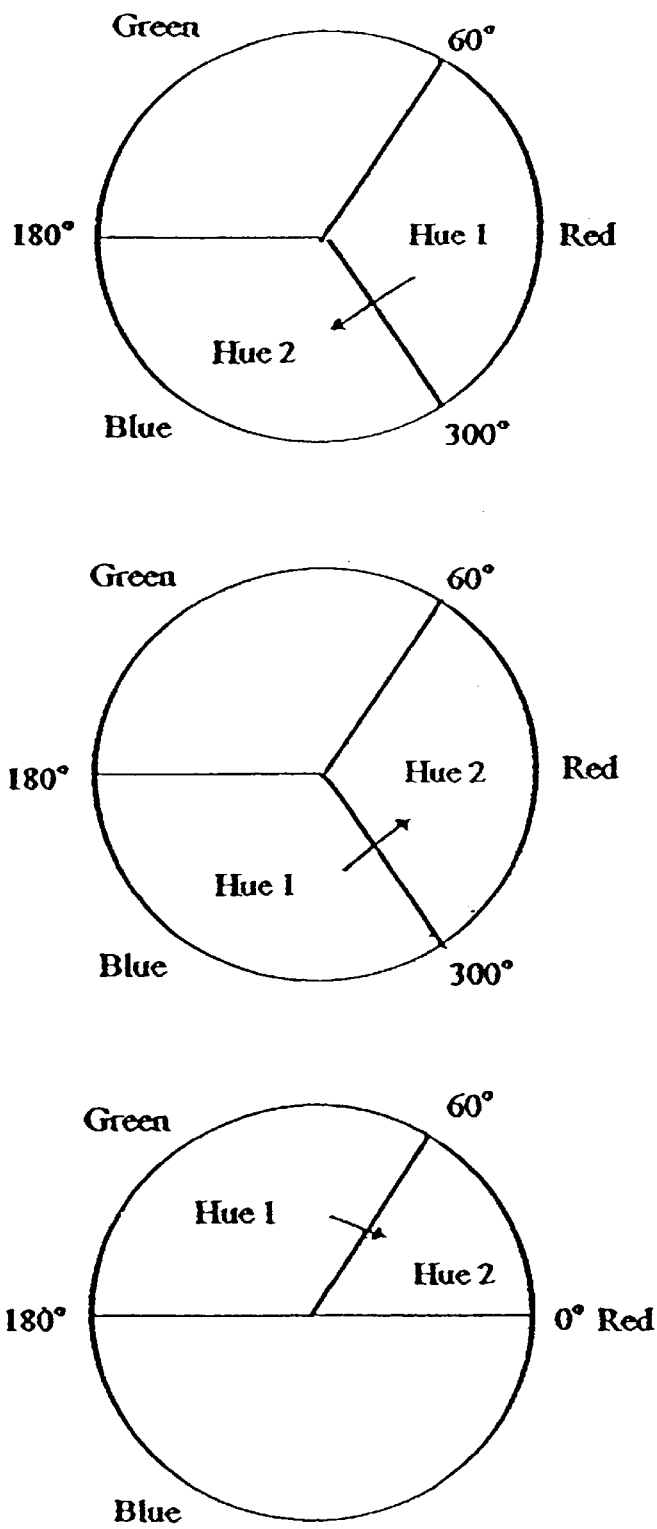
FIG. 8 is a schematic example of an objective colour scheme in accordance with the embodiments of the present invention.

An example of an objective "green free" colour scheme is illustrated in FIG. 8 using three HSV colour wheels. A hue of each (extracted) dominant colour represented by hue1 is mapped to hue2, as shown in FIG. 8, as expressed by the following equations:

(a) hue2=hue1+120° 180°≦hue1 <300° if(hue2≧360°), then hue2=hue2−360°

(b) hue2=hue1−120° 0°≦hue1<60°, 300°≦hue1<360° if(hue2<0°) hue2=hue2+360°

(c) hue2=(hue1−60°)/2 60°≦hue1<180° where hue2 represents a colour generated by the colour generation step 501. Preferably the saturation and value levels of the dominant and generated colours are kept constant. This example of a colour scheme can used in a interactive colour selection system where a user desires to eliminate a green component of a generated colour.

The foregoing only describes a few embodiments of the present invention and modifications and/or changes can be made thereto by a person skilled in the art without departing from the scope of the invention. For example, whilst the embodiments have been described with reference to RGB, L*a*b and HSV colour spaces, other colour spaces, both uniform and non-uniform, can be substituted without departing from the scope of the invention.

What is claimed is:

1. A method of determining image representative colors for an image comprising a plurality of image elements having color information associated therewith, the method including the sequential steps of:

spatially grouping the image elements into a plurality of image element groups on the basis of the color information of the image elements;

generating an initial representative color for each of the image element groups, the initial representative colors being derived from the color information of the image elements in the respective image element groups;

clustering the initial representative colors together into color clusters in a color space; and determining an image representative color based on each respective color cluster.

2. A method of determining image representative colors according to claim 1, wherein the step of spatially grouping the image elements into the plurality of image element groups comprises region growing.

3. A method of determining image representative colors according to claim 2, wherein the region growing method includes the steps of:

(i) selecting an image element not already grouped into an image element group, the image element defining a current selected color;

(ii) determining whether colors of ungrouped image elements disposed adjacent the selected image element fall within a predetermined range of colors based on the current color;

(iii) merging with the selected image element those image elements which fall within the predetermined range, the merged elements defining an image element group;

(iv) selecting one of the merged image elements not previously selected and applying steps (ii) and (iii) thereto;

(v) repeating step (iv) until all steps (ii) and (iii) have been applied to all image elements in the image element group;

(vi) repeating steps (i) to (v) until all image elements have been selected.

4. A method of determining image representative colors according to claim 1, wherein the clustering step is performed in a uniform color space.

5. A method of determining image representative colors according to claim 1 or claim 4, wherein the color space is RGB, L*a*b* or CMYK.

6. A method of determining image representative colors according to claim 1, further including the step of spatially segmenting the image on the basis of the color clusters.

7. A method of determining image representative colors according to claim 1, wherein the step of clustering the initial representative colors together into color clusters includes the sub-step of determining whether respective pairs of initial representative colors exceed a predetermined color difference threshold Dt in the color space, wherein pairs of initial representative colors not exceeding Dt are additively clustered together.

8. A method of providing one or more color suggestions for a given image comprising a plurality of image elements having colors associated therewith, the method including the steps of:
   (i) determining one or more image representative colors in relation to the image based on the colors of the image elements;
   (ii) applying a predefined set of color selection rules to the one or more image representative colors to generate said color suggestions; and
   (iii) suggesting one or more of the color suggestions;
   (iv) selecting one or more of said color suggestions for use in manipulating said image.

9. A method of providing one or more color suggestions according to claim 8, wherein the set of color selection rules includes a rule that, for a given hue, saturation and value of an extracted image representative color, a color suggestion having a similar hue but different saturation and value is generated.

10. A method of providing one or more color suggestions according to claim 8 or claim 9, wherein the set of color selection rules includes a rule that, for a given hue, saturation and value of an extracted image representative color, a color suggestion having a complementary hue is generated.

11. A method of providing one or more color suggestions according to claim 10, further including a rule that when the color suggestion having a complementary hue is generated, the color suggestion should also have a substantially similar saturation and value as the extracted image representative color.

12. A method of providing one or more color suggestions according to any one of claims 8 to 11, wherein a plurality of extracted image representative colors are provided, the method further including the step of selecting an extracted image representative color for which to provide a color suggestion, where a criterion for said selection step is selected from the group consisting of:
   a number of pixels represented by each of the extracted image representative colors;
   a relative saturation level, and
   the location within said given image of pixels represented by said extracted image representative colors.

13. A method of providing one or more color suggestions according to claim 8, wherein the set of color selection rules includes a rule that, for a given hue, saturation and value of an extracted image representative color, a color suggestion belonging to a desired color scheme is generated by calculating one or more functions of said given hue.

14. A computer program for determining image representative colors for an image comprising a plurality of image elements having color information associated therewith, said program comprising:
   code for spatially grouping the image elements into a plurality of image element groups on the basis of the color information of the image elements;
   code for generating an initial representative color for each of the image element groups, the initial representative colors being derived from the color information of the image elements in the respective image element groups;
   code for clustering the initial representative colors together into color clusters in a color space;
   code for determining an image representative color based on each respective color cluster;
   code for generating one or more color suggestions based on the image representative colors.

15. A computer program as claimed in claim 14 wherein said generation of color suggestions is further based on a predetermined color scheme.

16. A computer program as determined in claim 14 wherein said program further comprises:
   code for using one or more of the color suggestions in adding one or more visual elements to said image.

17. A computer readable medium, having a program recorded thereon, where the program is configured to make a computer execute a procedure for determining image representative colors for an image comprising a plurality of image elements having color information associated therewith, the procedure including the steps of:
   spatially grouping the image elements into a plurality of image element groups on the basis of the color information of the image elements;
   generating an initial representative color for each of the image element groups, the initial representative colors being derived from the color information of the image elements in the respective image element groups;
   clustering the initial representative colors together into color clusters in a color space;
   determining an image representative color based on each respective color cluster: and
   generating one or more color suggestions based on the image representative colors.

18. A method of determining image representative colors for an image comprising a plurality of image elements having color information associated therewith, the method including the sequential steps of:
   spatially grouping the image elements into a plurality of image element groups on the basis of the color information of the image elements;
   generating an initial representative color for each of the image element groups, the initial representative colors being derived from the color information of the image elements in the respective image element groups;
   clustering the initial representative colors together into color clusters in a color space;
   determining an image representative color based on each respective color cluster; and
   generating one or more color suggestions based on the image representative colors.

19. A method of providing one or more color suggestions for a given image comprising a plurality of image elements having colors associated therewith, the method including the steps of:
   (i) determining one or more image representative colors in relation to the image based on the colors of the image elements;
   (ii) applying a predefined set of color selection rules to the one or more image representative colors to generate said color suggestions;
   (iii) suggesting one or more of the color suggestions; and
   (iv) selecting one or more of said color suggestions for use in manipulating said image,
   wherein the set of color selection rules includes a rule that, for a given hue, saturation and value of an extracted image representative color, at least one set of color suggestions having a similar hue but different saturation and value is generated.

20. A method of providing one or more color suggestions according to claim 19, wherein, the set of color selection rules includes a rule that, for a given hue, saturation and value of an extracted image representative color, a color suggestion having a complementary hue is generated.

21. A method of providing one or more color suggestions according to claim 20, further including a rule that when the color suggestion having a complementary hue is generated, the color suggestion should also have a substantially similar saturation and value as the extracted image representative color.

22. A method of providing one or more color suggestions according to any one of claims 19 to 21, wherein a plurality of extracted image representative colors are provided, the method further including the step of selecting an extracted image representative color for which to provide a color suggestion, on the basis of either
- a number of pixels upon which selection of each of the extracted image representative colors; and
- a relative saturation level.

* * * * *